(12) United States Patent
Adachi

(10) Patent No.: US 9,177,487 B2
(45) Date of Patent: Nov. 3, 2015

(54) DIGITAL MAP POSITION INFORMATION TRANSFER METHOD

(75) Inventor: Shinya Adachi, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 73 days.

(21) Appl. No.: 11/684,698

(22) Filed: Mar. 12, 2007

(65) Prior Publication Data

US 2007/0150181 A1 Jun. 28, 2007

Related U.S. Application Data

(62) Division of application No. 11/007,895, filed on Dec. 8, 2004, now abandoned, which is a division of application No. 10/169,704, filed as application No. PCT/JP02/04168 on Apr. 25, 2002, now Pat. No. 6,920,932.

(30) Foreign Application Priority Data

Apr. 27, 2001 (JP) ................................ 2001-132610

(51) Int. Cl.
*G08G 1/123* (2006.01)
*G06K 9/46* (2006.01)
(Continued)

(52) U.S. Cl.
CPC .............. *G09B 29/106* (2013.01); *G01C 21/30* (2013.01)

(58) Field of Classification Search
USPC ......... 701/201, 209, 210, 117, 208, 400, 409, 701/410, 420, 414, 428, 118, 119, 516, 517, 701/518, 532, 534; 340/990, 995.14, 905, 340/988, 955.1; 342/357.13; 382/243
See application file for complete search history.

(56) References Cited

U.S. PATENT DOCUMENTS

| | | | |
|---|---|---|---|
| 4,807,127 A | 2/1989 | Tehmoku et al. | |
| 4,819,175 A | 4/1989 | Wuttke | |
| 4,893,246 A | 1/1990 | Iihoshi et al. | |

(Continued)

FOREIGN PATENT DOCUMENTS

| | | |
|---|---|---|
| EP | 0 478 438 | 4/1992 |
| EP | 0 478 438 B1 | 4/1992 |

(Continued)

OTHER PUBLICATIONS

Abstract of U.S. Pat. No. 5,736,941: Date issued: Apr. 1998.

(Continued)

*Primary Examiner* — Ronnie Mancho
(74) *Attorney, Agent, or Firm* — Pearne & Gordon LLP (57) ABSTRACT

It is an object of the invention to provide a method of transmitting position information of a digital map which can enhance matching precision on a receiving side.
The invention provides a method of transmitting position information of a digital map in which a transmitting side transmits a vector shape on the digital map and a receiving side specifies the vector shape on a self-digital map by map matching, wherein the transmitting side selects a portion in which a plurality of candidate points are generated with difficulty during the map matching as an endpoint of the vector shape and transmits the vector shape having the endpoint in the portion to the receiving side. Mismatching on the receiving side can be prevented and the position information on the digital map can be transmitted accurately.

1 Claim, 9 Drawing Sheets

(51) Int. Cl.
*G09B 29/10* (2006.01)
*G01C 21/30* (2006.01)

(56) References Cited

U.S. PATENT DOCUMENTS

| | | |
|---|---|---|
| 4,924,699 A | 5/1990 | Kuroda et al. |
| 4,930,888 A | 6/1990 | Freisleben et al. |
| 4,963,864 A | 10/1990 | Iihoshi et al. |
| 4,963,865 A | 10/1990 | Ichikawa et al. |
| 4,984,168 A | 1/1991 | Neukrichner et al. |
| 5,040,122 A | 8/1991 | Neukrichner et al. |
| 5,046,011 A | 9/1991 | Kakihara et al. |
| 5,067,082 A | 11/1991 | Nimura et al. |
| 5,214,757 A | 5/1993 | Mauney et al. |
| 5,307,278 A | 4/1994 | Hermans et al. |
| 5,311,195 A | 5/1994 | Mathis et al. |
| 5,442,559 A | 8/1995 | Kuwahara et al. |
| 5,488,559 A | 1/1996 | Seymour |
| 5,581,259 A | 12/1996 | Schipper |
| 5,742,923 A | 4/1998 | Odagawa |
| 5,815,118 A | 9/1998 | Schipper |
| 5,839,087 A | 11/1998 | Sato |
| 5,862,511 A | 1/1999 | Croyle et al. |
| 5,899,954 A | 5/1999 | Sato |
| 5,908,466 A | 6/1999 | Veugen et al. |
| 5,948,043 A | 9/1999 | Mathis |
| 5,995,023 A | 11/1999 | Kreft |
| 6,002,981 A | 12/1999 | Kreft |
| 6,011,494 A | 1/2000 | Watanabe et al. |
| 6,035,253 A | 3/2000 | Hayashi et al. |
| 6,038,559 A | 3/2000 | Ashby et al. |
| 6,061,627 A | 5/2000 | Sato |
| 6,101,443 A * | 8/2000 | Kato et al. ............ 701/414 |
| 6,108,603 A | 8/2000 | Karunanighi |
| 6,115,668 A | 9/2000 | Kaneko et al. |
| 6,178,377 B1 | 1/2001 | Ishihara et al. |
| 6,185,503 B1 * | 2/2001 | Sumizawa ............ 701/428 |
| 6,188,957 B1 | 2/2001 | Bechtolsheim et al. |
| 6,188,959 B1 | 2/2001 | Schupfner |
| 6,230,100 B1 | 5/2001 | Geier |
| 6,240,368 B1 | 5/2001 | Kreft |
| 6,324,468 B1 | 11/2001 | Meis et al. |
| 6,333,703 B1 | 12/2001 | Alewine et al. |
| 6,334,089 B2 | 12/2001 | Hessing |
| 6,345,229 B1 | 2/2002 | Honkomp et al. |
| 6,381,536 B1 | 4/2002 | Satoh et al. |
| 6,449,557 B2 | 9/2002 | Ata et al. |
| 6,490,519 B1 | 12/2002 | Lapidot et al. |
| 6,542,816 B1 * | 4/2003 | Ito et al. ............ 701/420 |
| 6,654,681 B1 * | 11/2003 | Kiendl et al. ............ 701/117 |
| 6,850,840 B1 * | 2/2005 | Willenbrock et al. ...... 701/208 |
| 7,353,108 B2 * | 4/2008 | Adachi ............ 701/410 |
| 7,634,452 B2 | 12/2009 | Adachi et al. |
| 2001/0001847 A1 | 5/2001 | Hessing |
| 2001/0007088 A1 | 7/2001 | Winter et al. |
| 2001/0012981 A1 | 8/2001 | Yamashita et al. |
| 2001/0016796 A1 | 8/2001 | Ata et al. |
| 2001/0037177 A1 | 11/2001 | Nishida et al. |
| 2003/0154019 A1 | 8/2003 | Adachi et al. |
| 2010/0070170 A1 | 3/2010 | Adachi et al. |

FOREIGN PATENT DOCUMENTS

| | | |
|---|---|---|
| EP | 0 875 877 | 11/1998 |
| EP | 0 875 877 A2 | 11/1998 |
| EP | 0 932 134 A1 | 7/1999 |
| EP | 1 022 578 | 7/2000 |
| EP | 1 022 578 A2 | 7/2000 |
| EP | 1 098 168 A2 | 5/2001 |
| EP | 1 102 036 A1 | 5/2001 |
| EP | 1 122 517 A2 | 8/2001 |
| EP | 1 167 923 A2 | 1/2002 |
| JP | 3-63521 | 3/1991 |
| JP | 6-331369 A | 12/1994 |
| JP | 6-341843 | 12/1994 |
| JP | 11-242166 | 8/1999 |
| JP | 2000-155896 A | 6/2000 |
| JP | 2000-258176 A | 9/2000 |
| JP | 2001-27539 A | 1/2001 |
| JP | 11-214068 | 2/2001 |
| JP | 2001-41757 A | 2/2001 |
| JP | 2001-66146 | 3/2001 |
| JP | 2001-66146 A | 3/2001 |
| WO | 98/27530 A1 | 6/1998 |
| WO | 98/45724 A1 | 10/1998 |
| WO | 98/54682 A1 | 12/1998 |
| WO | 99/24787 A2 | 5/1999 |
| WO | 99/56081 A2 | 11/1999 |
| WO | 99/56264 A1 | 11/1999 |
| WO | 00/08616 A1 | 2/2000 |
| WO | 00/49530 A1 | 8/2000 |
| WO | 00/50845 A1 | 8/2000 |
| WO | 01/01347 A1 | 1/2001 |
| WO | 01/18768 A1 | 3/2001 |
| WO | 01/18769 A1 | 3/2001 |
| WO | 01/50089 A1 | 7/2001 |
| WO | 01/50437 A1 | 7/2001 |
| WO | 01/75838 | 10/2001 |
| WO | 01/84081 A1 | 11/2001 |
| WO | 02/04894 A1 | 1/2002 |
| WO | 02/14788 A1 | 2/2002 |
| WO | 02/16874 A1 | 2/2002 |

OTHER PUBLICATIONS

Abstract of U.S. Pat. No. 5,745,865: Date issued: Apr. 1998.
Abstract of U.S. Pat. No. 5,748,107: Date issued: May 1998.
Abstract of U.S. Pat. No. 5,757,285: Date issued: May 1998.
Abstract of U.S. Pat. No. 5,797,112: Date issued: Aug. 1998.
Abstract of U.S. Pat. No. 5,812,069: Date issued: Sep. 1998.
Abstract of U.S. Pat. No. 5,826,212: Date issued: Oct. 1998.
Abstract of U.S. Pat. No. 5,828,322: Date issued: Oct. 1998.
Abstract of U.S. Pat. No. 5,842,146: Date issued: Nov. 1998.
Abstract of U.S. Pat. No. 5,850,190: Date issued: Dec. 1998.
Abstract of U.S. Pat. No. 5,905,451: Date issued: May 1999.
Abstract of U.S. Pat. No. 5,926,118: Date issued: Jul. 1999.
Abstract of U.S. Pat. No. 5,933,094: Date issued: Aug. 1999.
Abstract of U.S. Pat. No. 5,933,100: Date issued: Aug. 1999.
Abstract of U.S. Pat. No. 5,974,356: Date issued: Oct. 1999.
Abstract of U.S. Pat. No. 5,977,885: Date issued: Nov. 1999.
Abstract of U.S. Pat. No. 5,990,809: Date issued: Nov. 1999.
Abstract of U.S. Pat. No. 5,995,023: Date issued: Nov. 1999.
Abstract of U.S. Pat. No. 5,996,409: Date issued: Dec. 1999.
Abstract of U.S. Pat. No. 6,006,161: Date issued: Dec. 1999.
Abstract of U.S. Pat. No. 6,012,012: Date issued: Jan. 2000.
Abstract of U.S. Pat. No. 6,031,600: Date issued: Feb. 2000.
Abstract of U.S. Pat. No. 6,064,319: Date issued: May 2000.
Abstract of U.S. Pat. No. 6,097,313: Date issued: Aug. 2000.
Abstract of U.S. Pat. No. 6,104,480: Date issued: Aug. 2000.
Abstract of U.S. Pat. No. 6,107,940: Date issued: Aug. 2000.
Abstract of U.S. Pat. No. 6,107,941: Date issued: Aug. 2000.
Abstract of U.S. Pat. No. 6,111,521: Date issued: Aug. 2000.
Abstract of U.S. Pat. No. 6,111,523: Date issued: Aug. 2000.
Abstract of U.S. Pat. No. 6,114,973: Date issued: Sep. 2000.
Abstract of U.S. Pat. No. 6,137,564: Date issued: Oct. 2000.
Abstract of U.S. Pat. No. 6,150,961: Date issued: Nov. 2000.
Abstract of U.S. Pat. No. 6,163,752: Date issued: Dec. 2000.
Abstract of U.S. Pat. No. 6,169,955: Date issued: Jan. 2001.
Abstract of U.S. Pat. No. 6,169,956: Date issued: Jan. 2001.
Abstract of U.S. Pat. No. 6,178,378: Date issued: Jan. 2001.
Abstract of U.S. Pat. No. 6,192,314: Date issued: Feb. 2001.
Abstract of U.S. Pat. No. 6,208,268: Date issued: Mar. 2001.
Abstract of U.S. Pat. No. 6,212,473: Date issued: Apr. 2001.
Abstract of U.S. Pat. No. 6,223,125: Date issued: Apr. 2001.
Abstract of U.S. Pat. No. 6,230,099: Date issued: May 2001.
Abstract of U.S. Pat. No. 6,232,917: Date issued: May 2001.
Abstract of U.S. Pat. No. 6,236,336: Date issued: May 2001.
Abstract of U.S. Pat. No. 6,236,933: Date issued: May 2001.
Abstract of U.S. Pat. No. 6,240,368: Date issued: May 2001.
Abstract of U.S. Pat. No. 6,244,111: Date issued: Jun. 2001.

(56) References Cited

OTHER PUBLICATIONS

Abstract of U.S. Pat. No. 6,249,754: Date issued: Jun. 2001.
Abstract of U.S. Pat. No. 6,266,609: Date issued: Jul. 2001.
Abstract of U.S. Pat. No. 6,281,807: Date issued: Aug. 2001.
Abstract of U.S. Pat. No. 6,281,808: Date issued: Aug. 2001.
Abstract of U.S. Pat. No. 4,040,740: Date issued: Aug. 1977.
Abstract of U.S. Pat. No. 4,063,237: Date issued: Dec. 1977.
Abstract of U.S. Pat. No. 4,151,656: Date issued: May 1979.
Abstract of U.S. Pat. No. 4,196,474: Date issued: Apr. 1980.
Abstract of U.S. Pat. No. 4,251,797: Date issued: Feb. 1981.
Abstract of U.S. Pat. No. 4,304,487: Date issued: Dec. 1981.
Abstract of U.S. Pat. No. 4,725,957: Date issued: Feb. 1988.
Abstract of U.S. Pat. No. 4,728,888: Date issued: Mar. 1988.
Abstract of U.S. Pat. No. 4,729,172: Date issued: Mar. 1988.
Abstract of U.S. Pat. No. 4,731,727: Date issued: Mar. 1988.
Abstract of U.S. Pat. No. 4,733,179: Date issued: Mar. 1988.
Abstract of U.S. Pat. No. 4,782,453: Date issued: Nov. 1988.
Abstract of U.S. Pat. No. 4,784,237: Date issued: Nov. 1988.
Abstract of U.S. Pat. No. 4,807,264: Date issued: Feb. 1989.
Abstract of U.S. Pat. No. 4,835,870: Date issued: Jun. 1989.
Abstract of U.S. Pat. No. 4,989,333: Date issued: Feb. 1991.
Abstract of U.S. Pat. No. 5,020,143: Date issued: May 1991.
Abstract of U.S. Pat. No. 5,021,962: Date issued: Jun. 1991.
Abstract of U.S. Pat. No. 5,059,965: Date issued: Oct. 1991.
Abstract of U.S. Pat. No. 5,095,532: Date issued: Mar. 1992.
Abstract of U.S. Pat. No. 5,146,219: Date issued: Sep. 1992.
Abstract of U.S. Pat. No. 5,148,604: Date issued: Sep. 1992.
Abstract of U.S. Pat. No. 5,173,691: Date issued: Dec. 1992.
Abstract of U.S. Pat. No. 5,177,685: Date issued: Jan. 1993.
Abstract of U.S. Pat. No. 5,182,555: Date issued: Jan. 1993.
Abstract of U.S. Pat. No. 5,184,123: Date issued: Feb. 1993.
Abstract of U.S. Pat. No. 5,193,214: Date issued: Mar. 1993.
Abstract of U.S. Pat. No. 5,247,252: Date issued: Sep. 1993.
Abstract of U.S. Pat. No. 5,261,279: Date issued: Nov. 1993.
Abstract of U.S. Pat. No. 5,279,040: Date issued: Jan. 1994.
Abstract of U.S. Pat. No. 5,283,575: Date issued: Feb. 1994.
Abstract of U.S. Pat. No. 5,332,180: Date issued: Jul. 1994.
Abstract of U.S. Pat. No. 5,351,539: Date issued: Oct. 1994.
Abstract of U.S. Pat. No. 5,396,429: Date issued: Mar. 1995.
Abstract of U.S. Pat. No. 5,406,490: Date issued: Apr. 1995.
Abstract of U.S. Pat. No. 5,416,711: Date issued: May 1995.
Abstract of U.S. Pat. No. 5,438,687: Date issued: Aug. 1995.
Abstract of U.S. Pat. No. 5,440,389: Date issued: Aug. 1995.
Abstract of U.S. Pat. No. 5,465,088: Date issued: Nov. 1995.
Abstract of U.S. Pat. No. 5,473,930: Date issued: Dec. 1995.
Abstract of U.S. Pat. No. 5,487,009: Date issued: Jan. 1996.
Abstract of U.S. Pat. No. 5,504,482: Date issued: Apr. 1996.
Abstract of U.S. Pat. No. 5,508,917: Date issued: Apr. 1996.
Abstract of U.S. Pat. No. 5,515,042: Date issued: May 1996.
Abstract of U.S. Pat. No. 5,523,765: Date issued: Jun. 1996.
Abstract of U.S. Pat. No. 5,602,542: Date issued: Feb. 1997.
Abstract of U.S. Pat. No. 5,629,690: Date issued: May 1997.
Abstract of U.S. Pat. No. 5,659,476: Date issued: Aug. 1997.
Abstract of U.S. Pat. No. 5,703,293: Date issued: Dec. 1997.
Abstract of U.S. Pat. No. 5,710,566: Date issued: Jan. 1998.
Abstract of U.S. Pat. No. 6,292,747: Date issued: Sep. 2001.
Abstract of U.S. Pat. No. 6,293,024: Date issued: Sep. 2001.
Abstract of U.S. Pat. No. 6,298,303: Date issued: Oct. 2001.
Abstract of U.S. Pat. No. 6,321,158: Date issued: Nov. 2001.
Abstract of U.S. Pat. No. 6,321,162: Date issued: Nov. 2001.
Abstract of U.S. Pat. No. 6,324,467: Date issued: Nov. 2001.
Abstract of U.S. Pat. No. 6,324,468: Date issued: Nov. 2001.
Abstract of U.S. Pat. No. 6,324,888: Date issued: Dec. 2001.
Abstract of U.S. Pat. No. 6,326,887: Date issued: Dec. 2001.
Abstract of U.S. Pat. No. 6,327,532: Date issued: Dec. 2001.
Abstract of U.S. Pat. No. 6,333,703: Date issued: Dec. 2001.
Abstract of U.S. Pat. No. 6,334,089: Date issued: Dec. 2001.

* cited by examiner

| VECTOR DATA TYPE (= ROAD) | |
|---|---|
| PRECISION INFORMATION OF SHAPE ACQUIRING SOURCE MAP DATA | |
| ONE-WAY DIRECTION (FORWARD/REVERSE/NONE) | |
| TOTAL NUMBER OF NODES | |
| NODE NUMBER p1 | |
| NODE p1 RELATIVE COORDINATE IN X DIRECTION (LONGITUDE) | |
| NODE p1 RELATIVE COORDINATE IN Y DIRECTION (LATITUDE) | |
| p1 POSITION ERROR (m) | p1 DIRECTION ERROR (°) |
| NODE NUMBER p2 | |
| NODE p2 RELATIVE COORDINATE IN X DIRECTION (LONGITUDE) | |
| NODE p2 RELATIVE COORDINATE IN Y DIRECTION (LATITUDE) | |
| NODE p2 RELATIVE DIRECTION | |
| p2 POSITION ERROR (m) | p2 DIRECTION ERROR (°) |
| ⋮ | |
| NODE NUMBER pn | |
| NODE pn RELATIVE COORDINATE IN X DIRECTION (LONGITUDE) | |
| NODE pn RELATIVE COORDINATE IN Y DIRECTION (LATITUDE) | |

FIG. 9 (b)

| EVENT DATA TYPE (= ACCIDENT) |
|---|
| RELATED REGULATING INFORMATION (1 LANE REGULATION) |
| OCCURRENCE PLACE REFERENCE POINT NODE NUMBER (= p1) |
| DIRECTION FLAG (= FORWARD DIRECTION WITH RESPECTED TO NODE STRING) |
| RELATIVE DISTANCE < m > FROM REFERENCE POINT |
| ⋮ |
| EVENT NUMBER (= TRAFFIC CONGESTION) |
| MEAN SPEED IN TRAFFIC CONGESTION (= 15km) |
| OCCURRENCE PLACE REFERENCE NODE NUMBER (= pj) |
| DIRECTION FLAG (= REVERSE DIRECTION WITH RESPECT TO NODE STRING) |
| RELATIVE DISTANCE FROM REFERENCE POINT (START POINT SIDE) < m > |
| RELATIVE DISTANCE FROM REFERENCE POINT (END POINT SIDE) < m > |

FIG. 10

DIGITAL MAP POSITION INFORMATION TRANSFER METHOD

TECHNICAL FIELD

The present invention relates to a method of transmitting position information of a digital map, and more particularly to a method in which data to be transmitted are devised to accurately transfer a position on a digital map to the receiving side.

BACKGROUND ART

In recent years, the number of vehicles having a navigation machine onboard has rapidly increased. The navigation machine holds a digital map data base and displays a traffic jam or an accident position on a map based on traffic jam information or accident information which is provided from a traffic information center, and furthermore, executes a path search by adding their information to conditions.

The database of the digital map is created by several companies, and the map data include an error because of a difference in a basic view and a digitization technique and the error differs depending on a digital map created by each company. For this reason, in the case in which an accident position is to be transmitted through traffic information, for example, there is a possibility that the accident position might be identified on the wrong road depending on the type of the digital map data base held in the onboard machine if longitude and latitude data on the position are presented alone.

In order to improve the accuracy of the information transmission, conventionally, a node number is defined to a node such as an intersection present in a road system and a link number is defined to a link representing a road between nodes, each intersection and road are stored corresponding to a node number and a link number in a digital map data base created by each company, a road is specified based on a link number in traffic information, and a point on a road is displayed by an expression method, for example, a distance from a head. However, the node number and the link number which are defined in the road system should be changed according to the new construction or alteration of a road. Moreover, if the node number or the link number is changed, digital map data created by each company are to be updated. For this reason, a method of transmitting the position information of a digital map by using a node number and a link number requires a great social cost for maintenance.

In order to improve such a respect, the inventors of the invention have proposed the following method in JP-A-11-214068 and JP-A-11-242166.

In this method, when transmitting the position of a road on which an event such as a traffic jam or an accident occurs, the information providing side transmits, to the receiving side, "road shape data" comprising a coordinate string having (1) a node in which the road shape of a road section having a predetermined length including the event position is arranged on the road (2) and an interpolation point (the vertex of a polygonal line approximating the curved line of the road, which will be referred to as a "node" including the interpolation point if there is no notice in this specification) and (3) "event position data" indicative of an event position based on a relative position in the road section represented by the road shape data; and the side receiving this information carries out map matching by using the road shape data, specifies a road section on a self-digital map, and specifies an event generation position in the road section by using the event position data.

Moreover, the inventors of the invention have also proposed a method in which a procedure for the map matching is executed efficiently. This method employs a sequential matching technique, and the receiving side calculates the coordinates of an event position by using the received road shape data and event position data and adds the event position as a node in the node string of the road shape data. Then, the map matching is executed in order from a node on the start edge of the node string and a point which best matched with a node indicative of the event position is specified as the event position on the road of a self-digital map.

In the case in which the position information of the digital map is to be transmitted by these methods, there is an important problem in that matching precision on the receiving side is to be enhanced. In the sequential matching method, particularly, when the start point of the map matching is wrong, the error tends to propagate to the subsequent map matching so that mismatching is apt to be caused. Moreover, there is a problem in that the mismatching is easily generated in an intersection having a small intersecting angle.

The invention solves these problems and has an object to provide a method of transmitting the position information of a digital map which can enhance matching precision on the receiving side.

DISCLOSURE OF THE INVENTION

The invention provides a method of transmitting position information of a digital map in which a transmitting side transmits a vector shape on the digital map and a receiving side specifies the vector shape on a self-digital map by map matching, wherein the transmitting side selects a portion in which a plurality of candidate points are generated with difficulty during the map matching as an endpoint of the vector shape and transmits the vector shape having the endpoint in the portion to the receiving side.

Moreover, the transmitting side shifts an endpoint of the vector shape to a portion in which a plurality of candidate points are generated with difficulty during the map matching, and transmits, to the receiving side, the vector shape having a deformed endpoint position.

Furthermore, the transmitting side deforms an azimuth of the vector shape at an intersection in the middle of the vector shape in such a direction as to increase an angle formed by the vector shape and a connecting vector to be connected to the vector shape when the angle is small at the intersection, and transmits, to the receiving side, the vector shape having the deformed azimuth.

Consequently, mismatching on the receiving side can be prevented and the position information on the digital map can be transmitted accurately.

Figure 8:
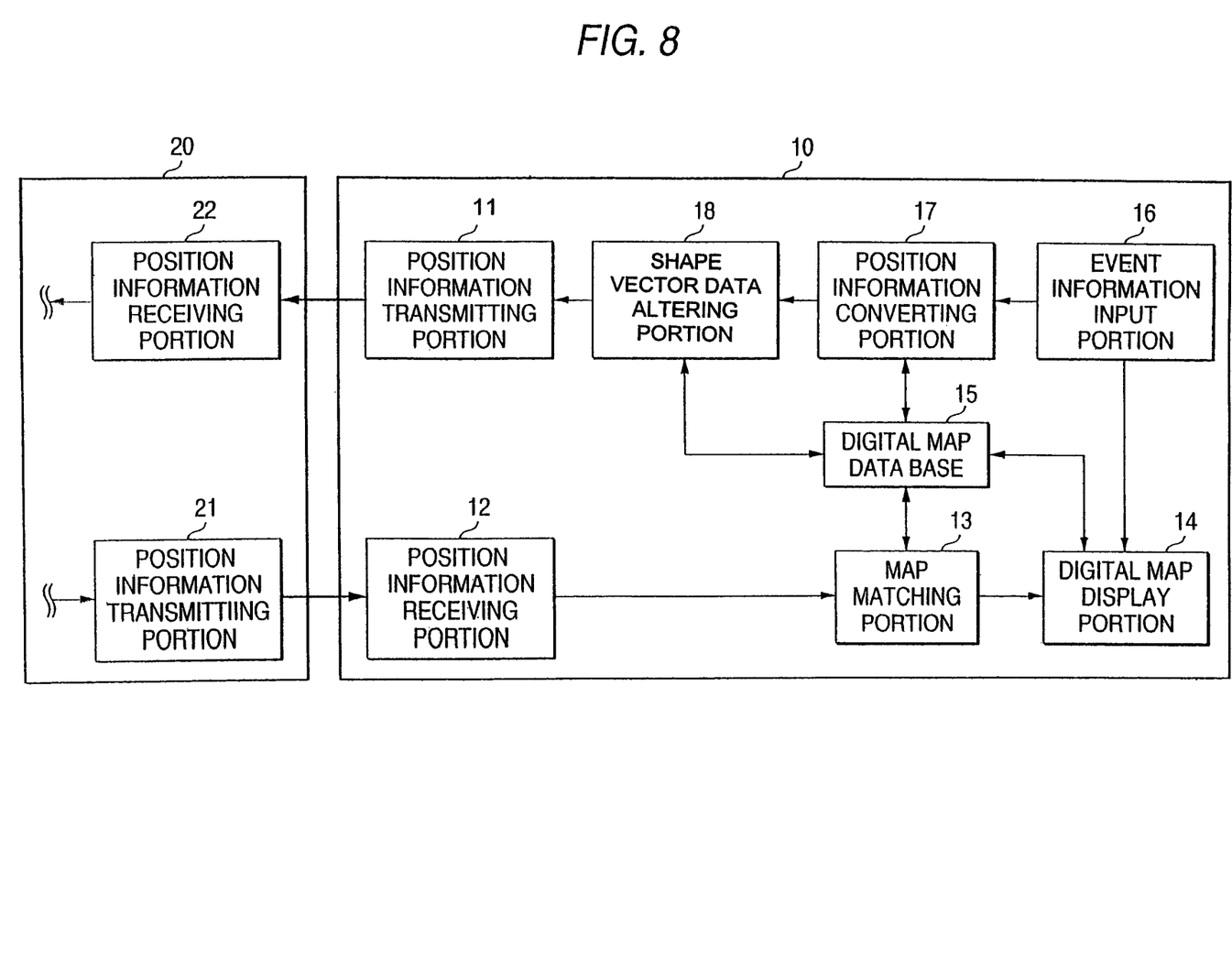
FIG. 8 is a block diagram showing the structure of a device for executing the position information transmitting method according to an embodiment, FIGS. 9(*a*) and 9(*b*) are diagrams showing data to be transmitted in the position information transmitting method according to the embodiment.

In the drawings, the reference numerals 10 and 20 denote a position information transmitting/receiving device, the reference numerals 11 and 21 denote a position information transmitting portion, the reference numerals 12 and 22 denote a position information receiving portion, the reference numeral 13 denotes a map matching portion, the reference numeral 14 denotes a digital map display portion, the reference numeral 15 denotes a digital map data base, the reference numeral 16 denotes an event information input portion, the reference numeral 17 denotes a position information converting portion, and the reference numeral 18 denotes a shape vector data altering portion.

BEST MODE OF CARRYING OUT THE INVENTION

In a method of transmitting position information of a digital map according to the invention, the transmitting side selects the node of a start point and alters the position of the node such that mismatching is not generated on the receiving side.

FIG. 8 shows a position information transmitting/receiving device 10 for exchanging event information on a road together with another device 20 as an example of a device for executing the position information transmitting method according to the invention.

The device 10 comprises a position information receiving portion 12 for receiving information including road shape data and event position data from a position information transmitting portion 21 of the other device 20, a digital map data base 15 for storing digital map data, a map matching portion 13 for carrying out map matching by using the road shape data and the event position data to specify an event position on a digital map, a digital map display portion 14 for superposing and displaying the event position on the map, an event input portion 16 for inputting event information, a position information converting portion 17 for generating road shape data and event position data for transmitting the event information, a shape vector data altering portion 18 for altering the road shape data such that the mismatching is not generated on the receiving side, and a position information transmitting portion 11 for transmitting position information including the generated road shape data and event position data to a position information receiving portion 22 of the other device 20.

Figure 9:
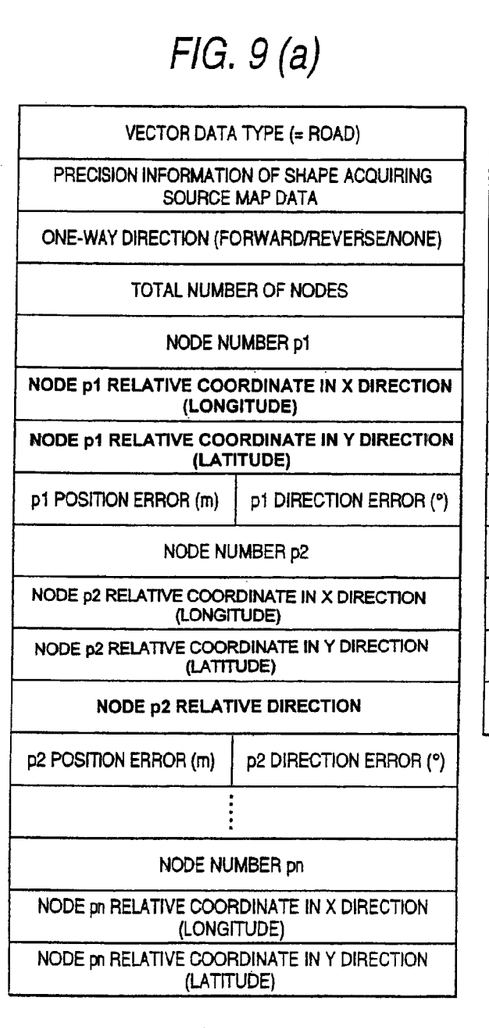

FIGS. 9(*a*) and 9(*b*) show an example of the position information transmitted from the position information transmitting portion 11. FIG. 9(*a*) shows shape vector data string information for specifying a road section which includes the road shape data. FIG. 9(*b*) shows traffic information including relative distance data from a reference point provided in the road section to the event position.

The position information converting portion 17 acquires coordinates (longitude/latitude) of nodes p1 to pn in the road section including the event position from the digital map data base 15 based on the event information input from the event input portion 16, generates road shape data (a shape vector data string), and furthermore, sets a reference point in the road section represented by the shape vector data string and generates-traffic information including relative distance data from the reference point to the event position.

The position information converting portion 17 selects the node p1 to be the start point for the map matching on the receiving side such that mismatching is not generated when generating the shape vector data string. This procedure will be described in a first embodiment.

(First Embodiment)

Figure 1:
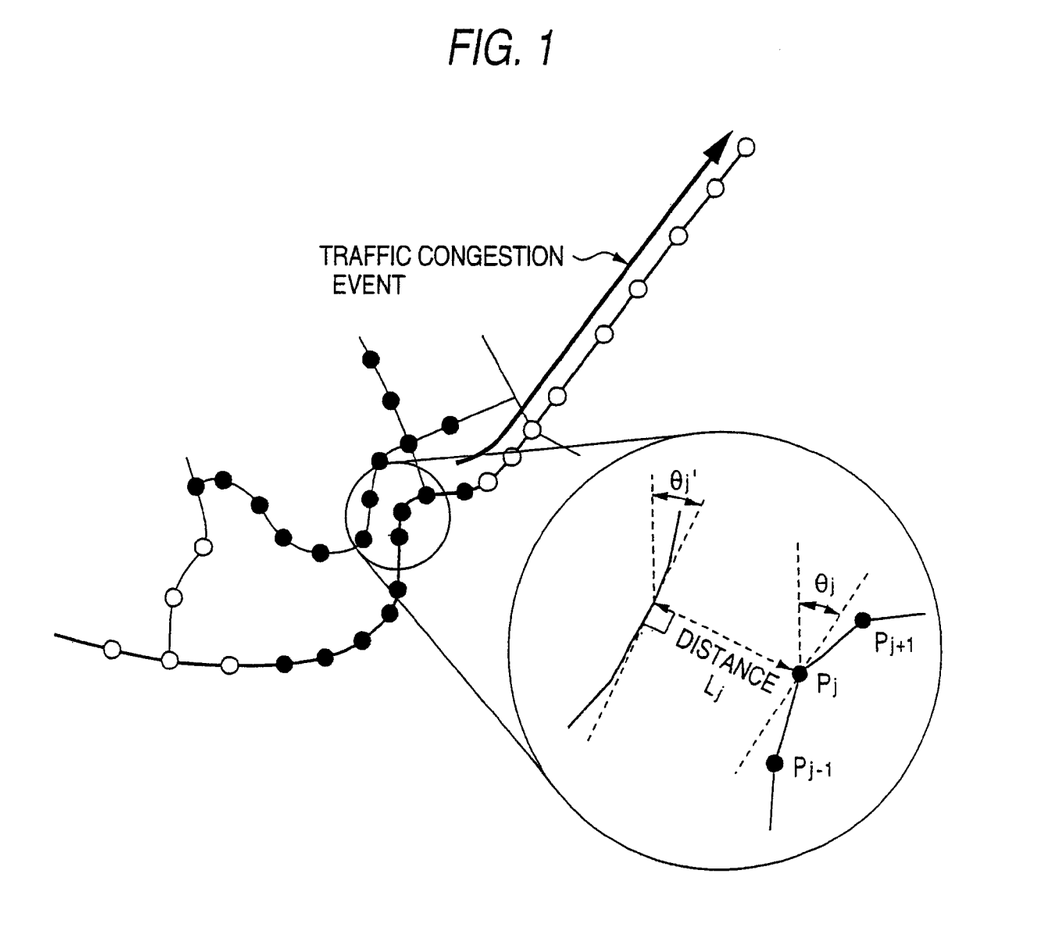
FIG. 1 is a view illustrating a processing on the transmitting side according to a first embodiment.
Figure 2:
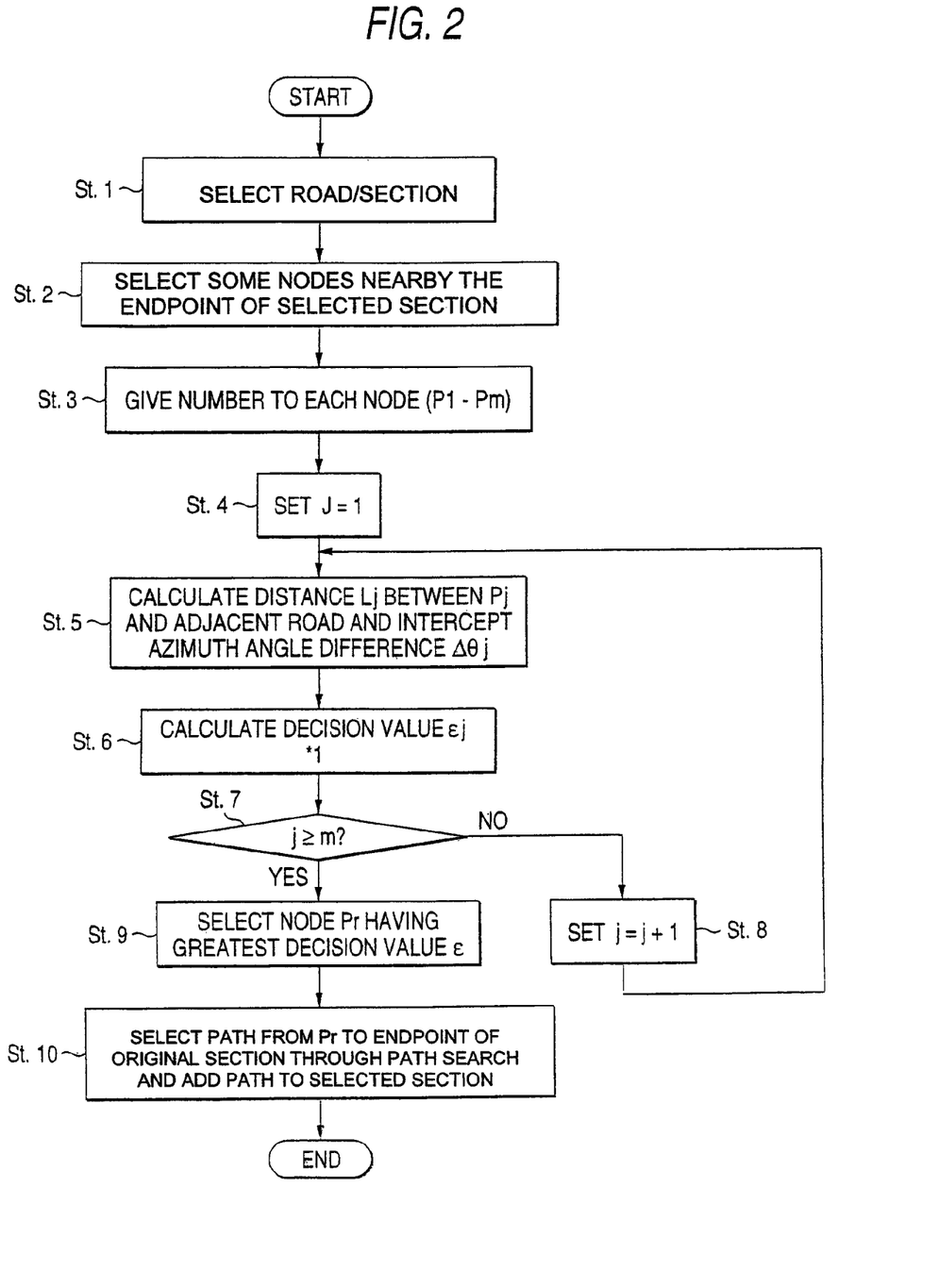
FIG. 2 is a flow chart showing a processing procedure on the transmitting side in a position information transmitting method according to the first embodiment.

FIG. 2 shows a procedure for selecting the node p1 by the position information converting portion 17. This procedure is executed in accordance with a program by a computer for implementing the function of the position information converting portion 17 based on the program. With reference to a view of FIG. 1, the procedure will be described.

In FIG. 1, a solid line indicates a road on a digital map, and white circles and black circles indicate nodes included in the shape of the road. In the case in which a traffic jam event occurs in a position on the road which is shown by an arrow in FIG. 1, a node to be a start point for map matching on the outside of an event section (that is, a node to be the first node p1 in a shape vector data string) is shown as one of the black circles. The position information converting portion 17 selects a node in which mismatching is not generated on the receiving side from the black circles based on the procedure shown in FIG. 2.

Step 1: Select a section of the road included in the shape vector data string,

Step 2: Select some nodes positioned nearby and separate from an endpoint of the selected section, Step 3: Give a number (p1 to pm) to each selected node, Step 4: Designate a first node pj with j=1, Step 5: Calculate a distance Lj between pj and an adjacent road and calculate an intercept azimuth angle difference Δθj (see FIG. 1), and Step 6: Calculate a decision value εj of the node pj by the following (Equation 1).

$$\varepsilon j = \alpha \cdot Lj + \beta \cdot |\Delta\theta j| \quad \text{(Equation 1)}$$
$$= \alpha \cdot Lj + \beta \cdot |\theta j - \theta j'|$$

α and β represent predetermined coefficients.

Step 7, Step 8: Carry out the process of the Step 5 and the Step 6 for all the nodes (p1 to pm), Step 9: Select a node pr having the greatest decision value ε, and Step 10: Select a path from the node pr to the endpoint of the original section using a path search and add the path to the selected section.

By the execution of such a procedure, a point in which the receiving side not likely to make an error can selected as the first node p1 in the shape vector data string to be the start point for the map matching.

(Second Embodiment)

In a second embodiment, a description will be given to a method of altering the endpoint position of a section to prevent mismatching on the receiving side when another road running in parallel with a road in the section is present.

Figure 3:
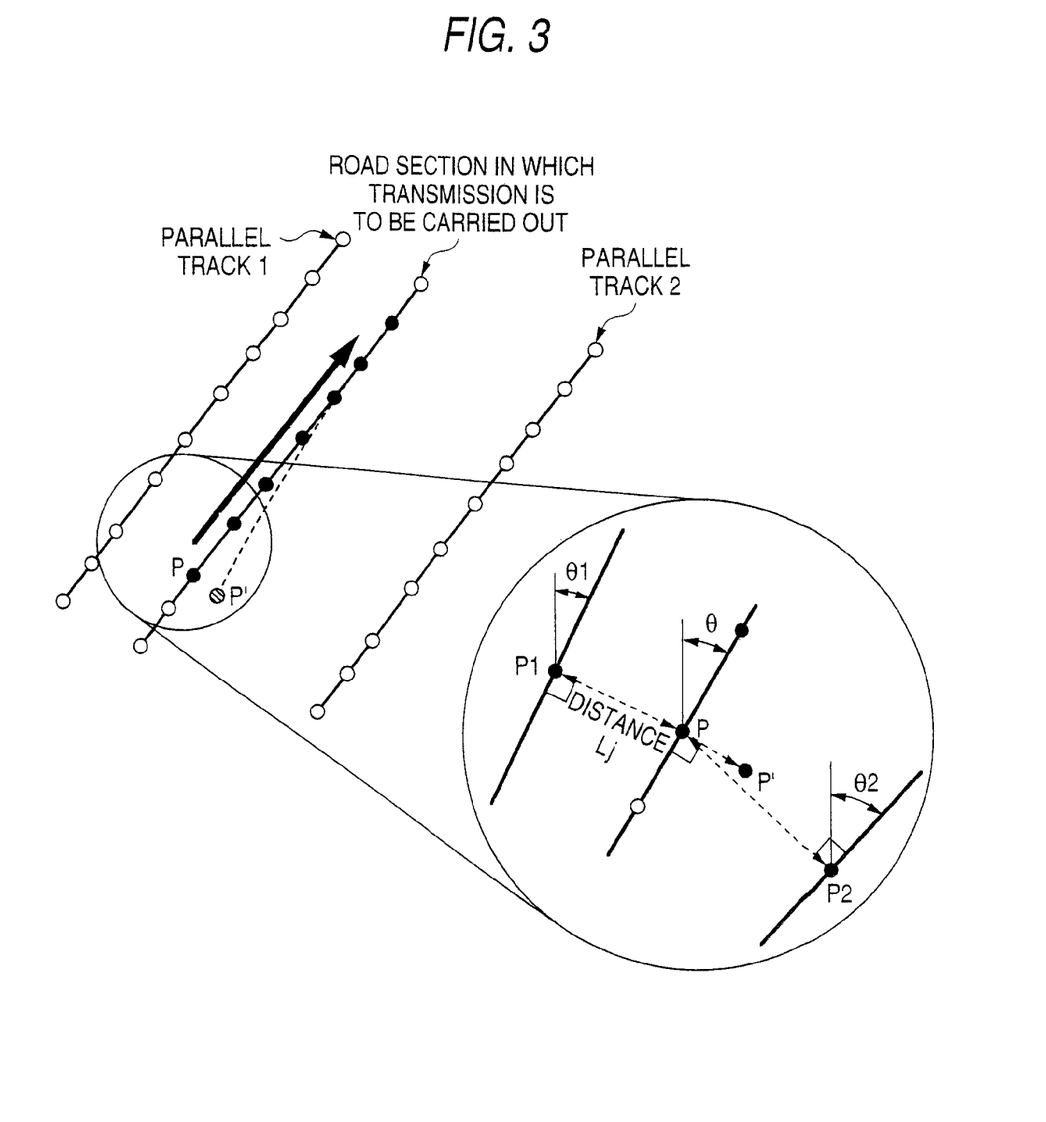
FIG. 3 is a view illustrating a processing on the transmitting side according to a second embodiment.

As shown in FIG. 3, in the case in which a road in a section is present between a parallel track 1 and a parallel track 2, the shape vector data altering portion 18 shifts an endpoint P in the section to the position of P', thereby preventing the endpoint P from being mismatched as a point on the parallel track 1. If P' is too close to the parallel track 2, there is a possibility that the endpoint might be mismatched as a point on the parallel track 2. Therefore, the shape vector data altering portion 18 selects the position of P' such that there is not such a possibility.

Figure 4:
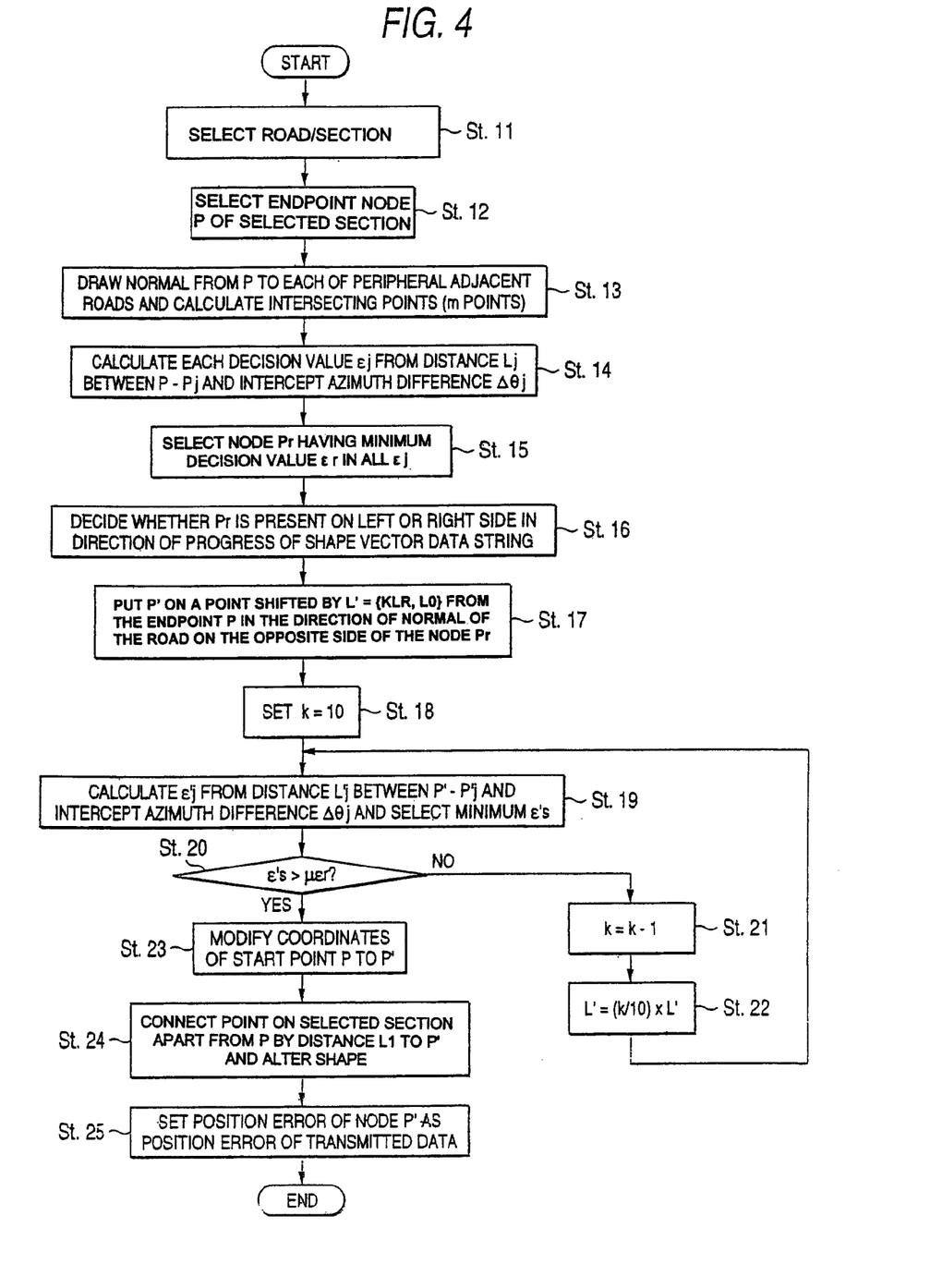
FIG. 4 is a flow chart showing a processing procedure on the transmitting side in a position information transmitting method according to the second embodiment.

FIG. 4 shows a procedure for the shape vector data altering portion 18. This procedure is executed in accordance with a program by a computer for implementing the function of the shape vector data altering portion 18 based on the program.

Step 11: Select a section of a road by the position information converting portion 17, Step 12: Select an endpoint node P of the selected section, Step 13: Draw a perpendicular line to each adjacent roads from P and calculate the coordinates of the intersecting points Pj (m points), Step 14: Calculate a decision value ϵj of each Pj from a distance Lj between P and Pj and an intercept azimuth Δθj based on the (Equation 1), Step 15: Select a node Pr having a minimum decision value ϵr among all ϵj, Step 16: Decide whether the node Pr is present on the left or right side in the direction of progress of the shape vector data string, and Step 17: Put P' on a point shifted by L'={K Lr, L0} from the endpoint P in the direction of the perpendicular line from the road on the opposite side of the node Pr.

Herein, K represents a predetermined coefficient of 0<K<1 and L0 represents a predetermined decision value of approximately 120 m. L'=K Lr is obtained if K Lr is equal to or smaller than L0, and L'=L0 is obtained if K Lr is greater than L0.

Next, it is decided whether or not the endpoint is too close to another road by the shift of the endpoint P to P'. If the endpoint is too close to another road, L' is reduced by 1/10. The process is repeated until this state of the endpoint is eliminated. More specifically, Step 18: Set a reduction coefficient k=10, Step 19: Carry out the same process as that of each of the Step 13 and the Step 14 from P' to obtain a distance L'j between P' and P'j and an intercept azimuth Δθ'j, and calculate a decision value ϵ'j of each P'j to select minimum ϵ's, and Step 20: Determine whether or not ϵ's>μϵr is satisfied. μ represents a predetermined value of approximately 1.2 to 2.

At the Step 20, if ϵ's>μr is not satisfied,

Step 21: Set the reduction coefficient k to k=k−1,

Step 22: Reduce L' by 1/10 based on L'=(k/10) L' and repeat the process from the Step 19.

Figure 5:
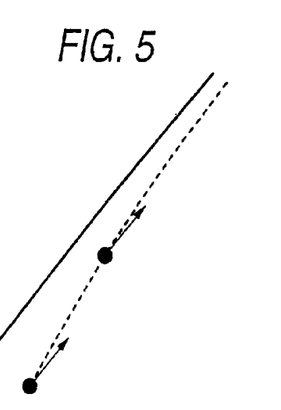
FIG. 5 is a view illustrating the deformation of shape vector data in the position information transmitting method according to the second embodiment.

In the case in which L' is reduced or ϵ's>μr is satisfied even if the L' is not reduced, Step 23: Modify the coordinates of the start point P to P', Step 24: Connect a point on the selected section apart from P by a distance L1 (a predetermined distance) to point P', thereby altering a shape of the selected section (a dotted line in FIG. 3), and Step 25: Set the position error of the node P' to be the position error of transmitted data (FIG. 9(a)). In this case, P' is shifted so that the shape itself of the selected section is altered and the direction does not always need to be changed as shown in FIG. 5.

Thus, by altering the endpoint of the selected section, mismatching on the receiving side can be prevented.

In the case in which the parallel tracks 1 and 2 running in parallel with the selected section are present as shown in FIG. 3, there can also be proposed a method for displacing the whole selected section in parallel. In this case, it is preferable that all the nodes are shifted in the same direction by a distance L' between P and P' (a left and right offset distance).

(Third Embodiment)

In a third embodiment, a description will be given to a method of altering a node position in a section to prevent mismatching on the receiving side in the case in which there is a branch path that a road in the section intersects at a small angle.

Figure 6:
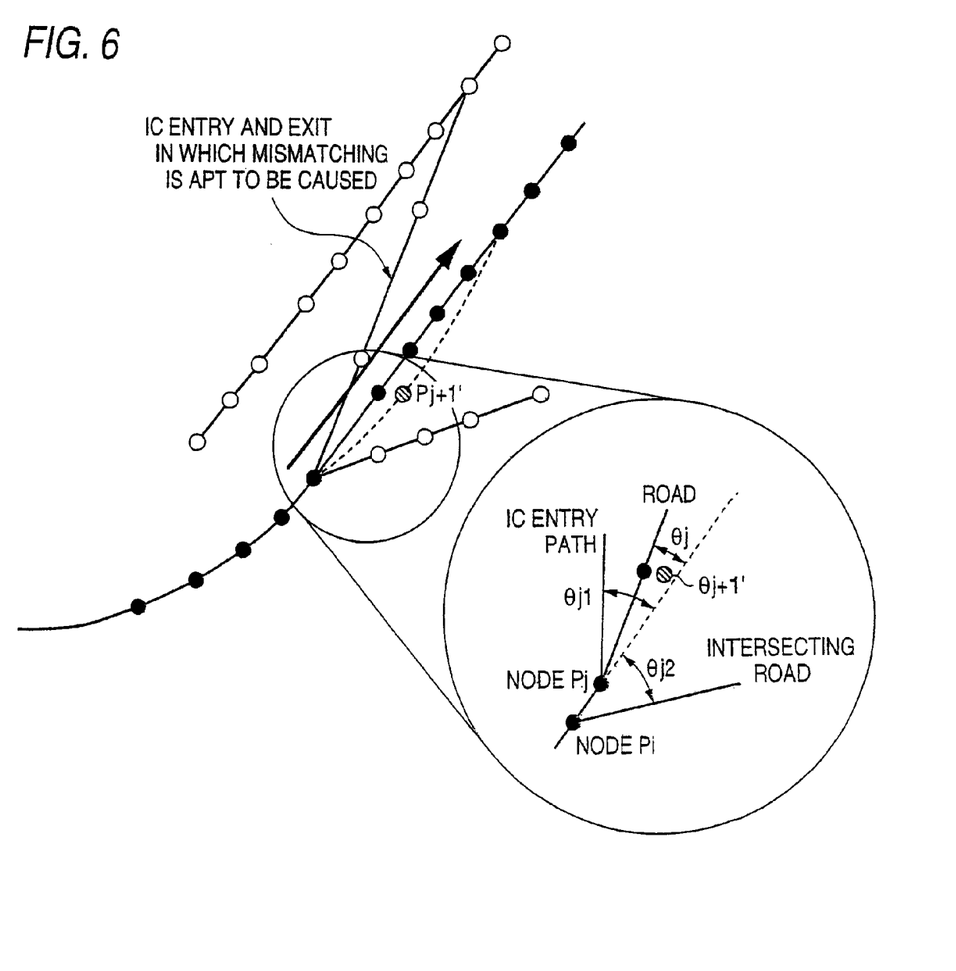
FIG. 6 is a view illustrating a processing on the transmitting side according to a third embodiment.

The entry and exit paths of an interchange intersect a main track at a small angle as shown in FIG. 6. Therefore, when sequential matching is carried out by using a shape vector data string representing a section at the receiving side, mismatching is apt to be caused. The shape vector data altering portion 18 shifts the position of a node in the section to Pj+1', thereby preventing the mismatching. Also in this case, if the point Pj+1' is too close to another connecting road, there is a possibility that the mismatching might be caused. Therefore, the shape vector data deforming portion 18 selects the position of Pj+1' such that there is not such a possibility.

Figure 7:
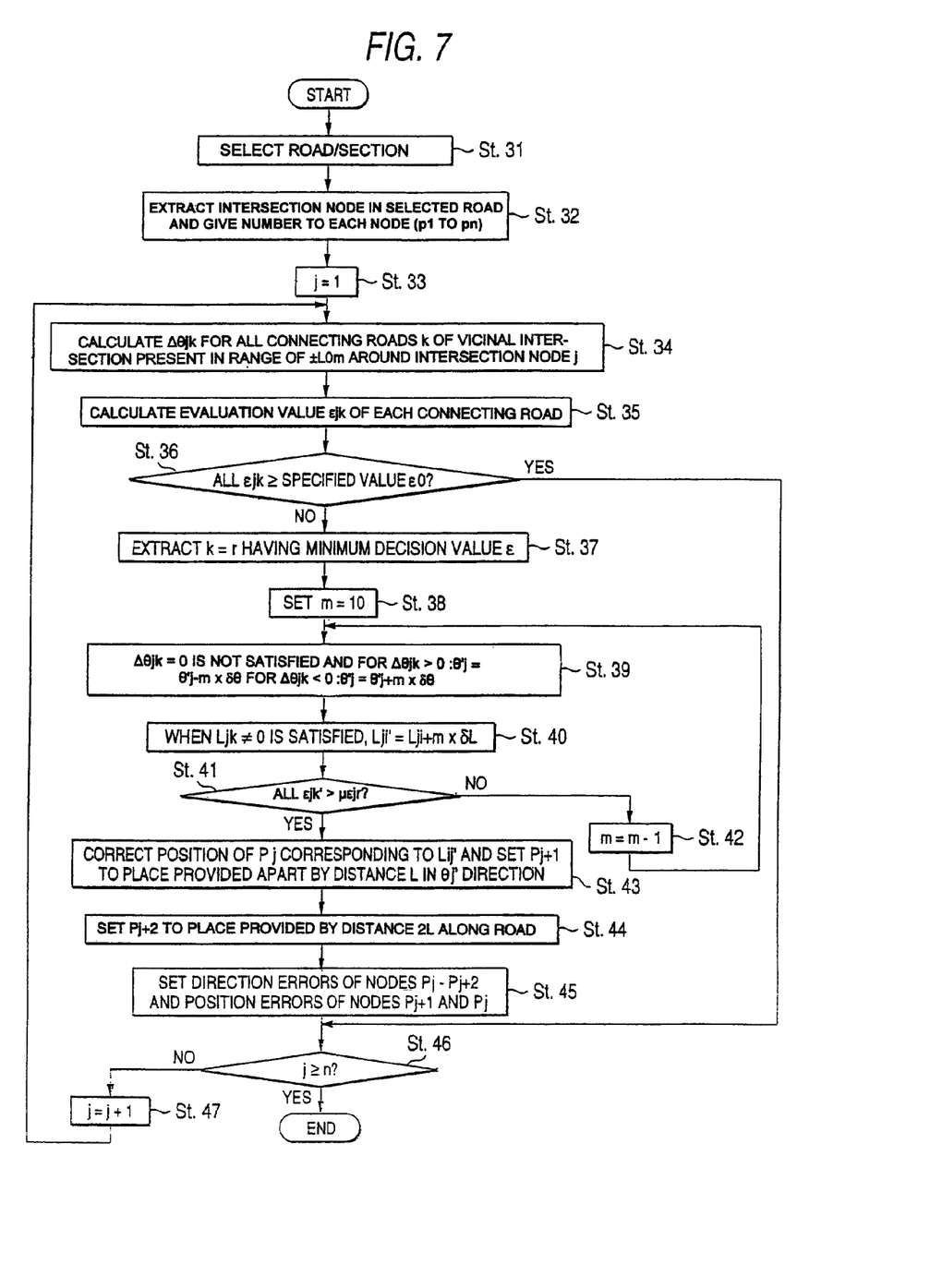
FIG. 7 is a flow chart showing a processing procedure on the transmitting side in a position information transmitting method according to the third embodiment.

FIG. 7 shows the procedure of the shape vector data altering portion 18 in this case. This procedure is executed in accordance with a program by a computer for implementing the function of the shape vector data deforming portion 18 based on the program.

Step 31: Select a section of a road by the position information converting portion 17, Step 32: Extract an intersection node in the selected section and give a number to each node (p1 to pn), Step 33: Designate a first node pj with j=1, and Step 34: Calculate Δθjk for all connecting roads (intersecting roads) k at a vicinal intersection present in a range of ±L0m (L0 represents a predetermined distance of approximately 120 m) around the intersection node pj. Δθjk is obtained by Δθjk=θj−θjk when θj: a turning angle at the node pj on the road, and θjk: a turning angle for the intersecting road k as shown in FIG. 6.

Step 35: Calculate an evaluation value ϵjk for each connecting road by (Equation 2).

$$\epsilon jk = \alpha |\Delta \theta jk| + \beta \cdot Lji \quad \text{(Equation 2)}$$

Herein, Lji represents a distance from the node pj to an intersection in which the connecting road k is present.

Step 36: If all ϵjk are equal to or greater than a specified value ϵ0, the processing proceeds to Step 46. If not so, that is, a connecting road intersecting at a small angle is present, Step 37: Extract k=r having a minimum evaluation value ϵ.

Subsequently, the shape of the selected road is altered such that the connecting angle of the selected road and the connecting road r is increased, and furthermore, a space with an intersection having the connecting road r is increased if the same intersection is shifted longitudinally. Moreover, the evaluation value is obtained after the alteration. If the road is too close to another connecting road due to the alteration, the amount of alteration is decreased by 1/10 and the decrease is repeated until such a state is eliminated. More specifically, Step 38: Set m=10, and Step 39: The connecting angle is increased as follows: when Δθjr≈0 is not satisfied, and:

Δθjr is positive, θj'=θj−m·δθ

Δθjr is negative, θj'=θj+m·δθ

δθ represents a predetermined value of approximately 1.5 degrees.

Step 40: Increase the intersection space to $Lji'=Lji+m\ \delta L$ when $Lji\neq 0$ is satisfied. $\delta L$ represents a predetermined distance of approximately 10 m.

Step 41: Calculate an evaluation value $\epsilon jk'$ of each connecting road after the alteration and decide whether or not all $\epsilon jk'$ are greater than $\mu\epsilon jr$ in order to obtain the result of the alteration.

When all $\epsilon jk'$ are not greater than $\mu\epsilon jr$,

Step 42: Set $m=m-1$ and the process of the Steps 39 and 40 is repeated,

At the Step 41, in the case in which the amount of alteration is decreased or $\epsilon jk'>\mu\epsilon jr$ is satisfied even if the same amount is not decreased, Step 43: Modify the position of the node pj by Lji' and set pj+1 to a position placed apart by a distance L (a predetermined distance) in a $\theta j'$ direction, Step 44: Set pj+2 to a place positioned at a distance 2L along the road, Step 45: Calculate the direction errors of the nodes pj to pj+2 and the position errors of the nodes pj+1 and pj and set them to the transmitted data (FIG. 9(a)), and Step 46, Step 47: Repeat the procedure from the Step 34 for all the intersection nodes (p1 to pn).

Thus, by altering the object selected section, it is possible to prevent mismatching on the receiving side.

While the positions of pj+1 and pj+2 are modified at the Steps 43 and 44 with the direction altering of pj, this processing is not always required. In the case in which the modification of the position is not carried out, the direction error of the node pj and the position error of the node p are set at the Step 45.

At the Step 39, moreover, the direction altering is not carried out if $\Delta\theta jr\approx 0$ is satisfied. In the case of a lattice-shaped road system, there is a possibility that navigation might be carried out beyond the road if the angle is forcibly changed.

Figure 10:
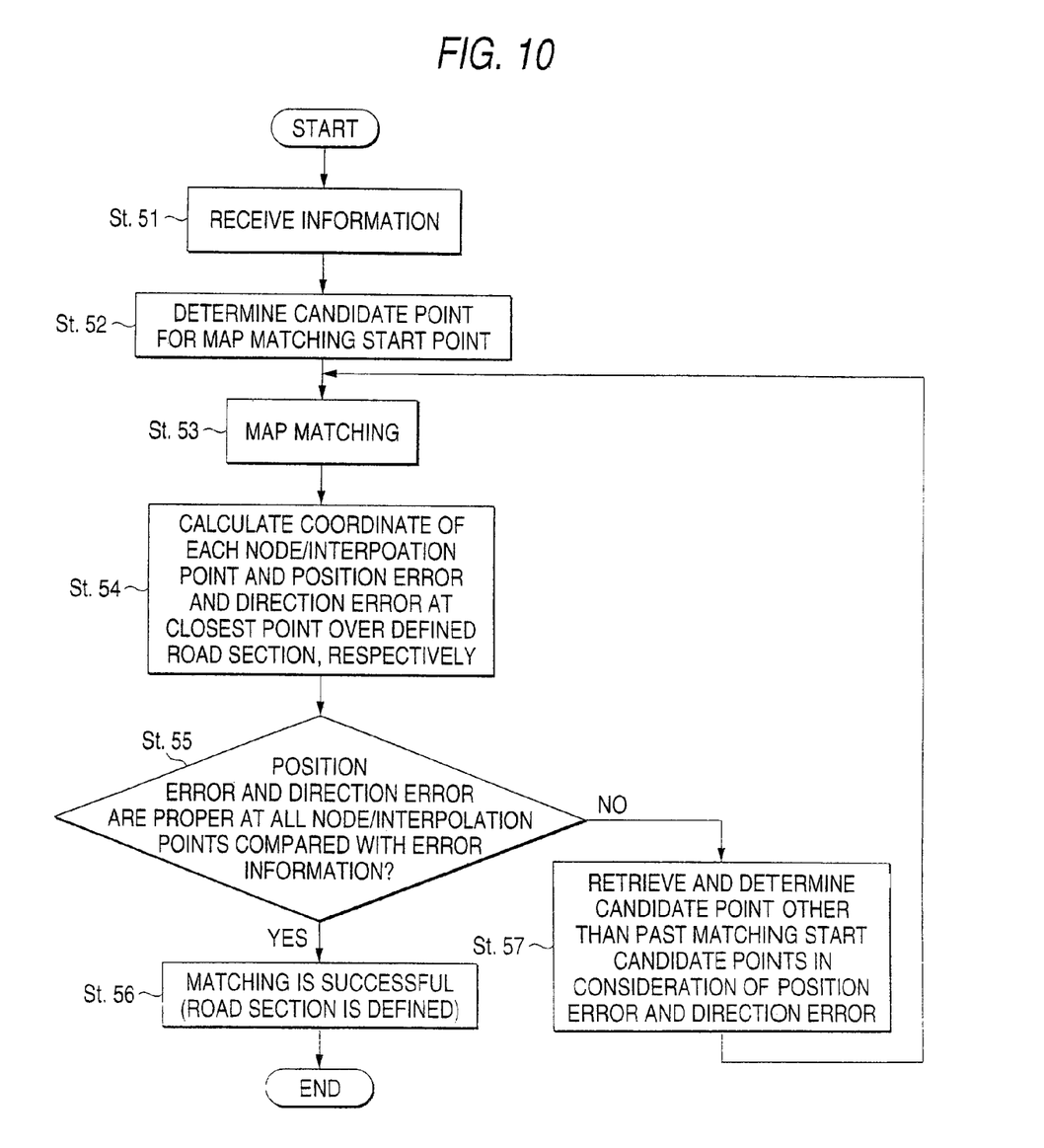
FIG. 10 is a flow chart showing a map matching procedure in the position information transmitting method according to the embodiment.

FIG. 10 shows a procedure to be carried out by the map matching portion 13 on the receiving side when receiving the position information shown in FIG. 9(a) in which the shape vector data are deformed.

Step 51: Receive the position information,

Step 52: Determine a candidate point for a map matching start point,

Step 53: Carry out map matching,

Step 54: Calculate a position error and a direction error between the coordinates of each node in the received shape vector data and the nearest point on the road section of a digital map which is defined by the map matching, respectively, and Step 55: Decide whether or not the position errors and direction errors of all the nodes are proper as compared with error information included in the received position information. If the errors are proper, Step 56: Decide that the matching is successful and define the road section.

If the errors are not proper in the Step 55,

Step 57: Retrieve and determine a candidate point other than the matching starting candidate point in consideration of while considering the position errors and the direction errors.

By such a procedure, it is possible to accurately specify a position on a digital map which is transmitted. When the transmitting side selects the matching start point and alters the shape vector data as described in each embodiment, the receiving side can prevent the occurrence of the mismatching even if a sequential matching method or a shape matching method is employed.

While the description has been given, as an example, to the case in which the position on the road of the digital map is transmitted, the invention can be applied to the case in which positions on various shape vectors represented on a digital map such as rivers or a contour line in addition to the road are to be transmitted.

While the invention has been described in detail with reference to the specific embodiments, it is apparent to the skilled in the art that various changes and modifications can be made without departing from the spirit and scope of the invention.

The application is based on Japanese Patent Application (2001-132610) filed on Apr. 27, 2001 and the contents thereof are incorporated by reference.

<Industrial Applicability>

As is apparent from the above description, in the position information transmitting method according to the invention, mismatching on the receiving side can be prevented so that matching precision can be enhanced. Accordingly, position information on a digital map can be transmitted accurately.

What is claimed is:

1. A method of generating a shape vector data string including a traffic event occurrence section on a transmitting side digital map in a transmitting side, transmitting the shape vector data string from the transmitting side to a receiving side, and specifying a location of the traffic event occurrence section on a receiving side digital map in the receiving side based on the shape vector data string transmitted from the transmitting side, comprising the steps of:

shifting a location of an endpoint of the shape vector data string under a predetermined condition to generate an altered shape vector data string in the transmitting side; and transmitting the altered shape vector data string from the transmitting side to the receiving side, wherein the altered shape vector data string includes a coordinate string of nodes arranged along a road.

* * * * *